United States Patent Office 3,155,571
Patented Nov. 3, 1964

3,155,571
ANTHELMINTIC COMPOSITIONS AND
METHODS OF USING SAME
Lewis H. Sarett, Princeton, and Horace D. Brown, Plainfield, N.J., assignors to Merck & Co., Inc., Rahway, N.J., a corporation of New Jersey
No Drawing. Filed May 4, 1960, Ser. No. 26,700
8 Claims. (Cl. 167—53)

This invention relates to novel compositions useful in the control of helminthic infections. More particularly, it is directed to anthelmintic compositions containing certain substituted benzimidazoles and to methods of using them in the prevention and treatment of helminthiasis.

The infection known as helminthiasis involves infestation of the body and particularly the gastro-intestinal tract of man and other domestic animals such as cattle, sheep, goats, swine, dogs and poultry with certain species of parasitic worms known as helminths. Among the helminthic parasites, the nematodes of the genera Haemonchus, Trichostrongylus, Ostertagia, Nematodirus, Cooperia, Bunostomum, Oesophagostomum, Chabertia, Trichuris, Ascaris, Cappillaria, Heterakis and Ancylostoma are the most common parasites of domestic animals. The diseases attributable to such parasitic infections, such as ascariasis, trichostrongylosis and gross parasitism are very widespread and serious. The diseased host almost inevitably suffers from such conditions as malnutrition, anemia and general weakness. However, in addition to the above conditions which, of course, necessitate increasing the nutrient intake by the host, helminthiasis may have more disastrous consequences. The diseased host may suffer from severe inflammation of the intestinal lining resulting in hemorrhaging. Moreover, more advanced and uncontrolled cases of helminthiasis can lead to prostration and death. It is obvious from the above that helminthiasis is a disease of major concern from the standpoint of both public health and economic losses brought about by infestation of domestic animals with parasitic worms and that the provision of methods and compositions which are effective in preventing and treating helminthiasis would be highly welcomed.

One object of the present invention is to provide novel compositions which are effective in controlling and preventing helminthiasis. A further object of this invention is to provide safe, convenient and effective methods for preventing and treating helminthic infections. Other objects will become apparent from the following specification and claims.

In accordance with the present invention, it has been found that benzimidazoles having at the 2-position of the benzimidazole ring nucleus a 5-membered heterocyclic radical containing one atom of either nitrogen, oxygen or sulfur possess a significant degree of anthelmintic activity and may be effectively employed in the treatment and/or prevention of helminthiasis.

The anthelmintic compounds within the purview of this invention may be represented by the general formulae

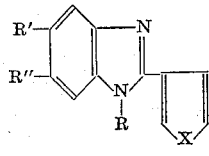 and 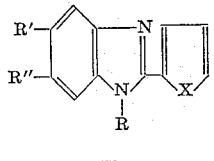

I  II wherein X may be O, S. or NH and R is hydrogen, a lower alkyl or lower alkenyl radical and R' and R" are hydrogen, lower alkyl or lower alkoxy. The invention also includes within its scope the acid addition salts of these benzimidazoles.

As is evident from the above structural formulae, all of the compounds of this invention have at the 2-position of the benzimidazole nucleus a 5-membered heterocyclic radical containing one atom of either nitrogen, oxygen or sulfur. The heterocyclic radical which may be a thienyl, furyl or pyrryl radical is attached to the benzimidazole nucleus at either the 2- or 3-positions of the heterocyclic ring. The N–1 position of the benzimidazoles may be substituted with hydrogen, a lower alkyl group such as methyl, ethyl, propyl or isopropyl, or a lower alkenyl radical of the type represented by allyl or methallyl. The alkyl and alkenyl radicals preferably contain less than 6 carbon atoms. If desired, the 6-membered ring of the benzimidazole nucleus may also be substituted with a lower alkyl or lower alkoxy group at the 5- and/or 6-positions. As representative of the 2-thienyl, 2-furyl and 2-pyrryl benzimidazole compounds useful in the present invention, there may be mentioned 2-(2'-thienyl) benzimidazole,
2-(3'-thienyl) benzimidazole,
1-methyl-2-(2'-thienyl) benzimidazole,
1,5-dimethyl-2-(2'-thienyl) benzimidazole,
2-(2'-thienyl)-5,6-dimethyl benzimidazole,
2-(2'-thienyl)-5-methyl benzimidazole,
1-ethyl-2-(3'-thienyl) benzimidazole,
1-allyl-2-(3'-thienyl) benzimidazole,
2-(3'-thienyl)-5,6-dimethoxy benzimidazole,
2-(2'-furyl) benzimidazole,
2-(3'-furyl) benzimidazole,
1-methallyl-2-(3'-furyl) benzimidazole,
1-butyl-2-(2'-furyl) benzimidazole,
2-(2'-pyrryl) benzimidazole,
2-(3'-pyrryl) benzimidazole,
1-ethyl-2-(2'-pyrryl) benzimidazole,
1-allyl-2-(3'-pyrryl) benzimidazole and
2-(2'-pyrryl)-5-ethoxy benzimidazole.

The acid addition salts of the 2-heterocyclic benzimidazoles described herein likewise possess significant anthelmintic activity and may also be employed in the treatment and/or prevention of helminthiasis. Such salts are conveniently prepared by treatment of the free base with acid. Illustrative of the salts of the 2-heterocyclic benzimidazoles which may be utilized in the present invention are the mineral acid salts such as the hydrohalides, e.g., hydrochloride, hydrobromide, hydroiodide, sulfates, nitrates, phosphates and the like, the aliphatic acid salts such as the acetate, trimethyl acetate, t-butyl acetate, propionate and the like, the amino acid salts such as the hippurate, the salts of polycarboxylic acids such as the citrate, oxalate, succinate and the like and salts of other organic acids such as the benzoate, embonate and hydroxynaphthoate salts. Because of the presence of a basic nitrogen in the pyrryl radical it will be appreciated that di-salts of certain of the 2-pyrryl benzimidazoles may also be obtained. However, the nature of the salt is not critical and any salt of the 2-heterocyclic benzimidazoles which is edible and substantially non-toxic may be employed.

The 2-thienyl benzimidazoles, wherein the point of attachment to the benzimidazole moiety is either at the 2- or 3-position of the thiophene ring, represent a preferred aspect of the invention. The preparation of these substances and the other 2-substituted benzimidazoles described herein comprises broadly the reaction of a thienyl, furyl or pyrryl carboxylic acid or derivative thereof, such as an ester, amide, nitrile, acid halide, or aldehyde, with a compound of the general formula

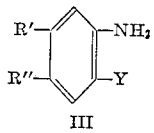

III wherein Y is —NO$_2$, —NH$_2$ or NHR, R is lower alkyl or lower alkenyl, and R' and R'' are hydrogen, lower alkyl or lower alkoxy.

According to one process, the 2-heterocyclic benzimidazoles are prepared by reacting together at elevated temperatures an o-phenylenediamine and a heterocyclic carboxylic acid (or derivative thereof) in polyphosphoric acid. The optimum reaction time and temperature will, of course, depend to some extent on the particular reactants employed, but in general good yields of the desired compounds are obtained by conducting the process at temperatures of about 150°–200° C. for from 2 to 6 hours. The heterocyclic carboxylic acid itself may be used or alternatively, a lower alkyl ester or amide of such acids may be employed. Although the relative amounts of reactants employed is not critical it is preferred to employ substantially equi-molar amounts of the heterocyclic compound and the diamine, and from about 5–20 parts by weight of polyphosphoric acid per part of heterocycle. The desired 2-substituted benzimidazoles are recovered by cooling the reaction mixture and diluting it with water. When the benzimidazoles do not crystallize readily under these conditions they are precipitated by neutralizing the quenched mixture with a base such as ammonium hydroxide, an alkali metal hydroxide or an alkali metal carbonate.

According to another process, the 2-heterocyclic benzimidazoles are prepared by condensing a heterocyclic aldehyde with an o-phenylenediamine or an N-substituted-o-phenylenediamine in a suitable inert solvent such as a lower alkanol to form the Schiff base of the aldehyde and the primary amino and then converting the intermediate base to the benzimidazole. In the conversion, ring closure of the Schiff base to the 2-heterocyclic benzimidazole is effected with a suitable oxidizing agent such as cupric acetate, lead tetraacetate, mercuric acetate, air and the like. Where a heavy metal reagent is employed to bring about the benzimidazole formation, an insoluble heavy metal salt of the 2-heterocyclic benzimidazole is formed. The free benzimidazole is readily obtained by suspending the salt in alcohol and precipitating the heavy metal therefrom with reagents suitable for this purpose such as hydrogen sulfide, ammonium polysulfide, ammonium hydroxide and the like. The desired solid 2-heterocyclic benzimidazoles are recovered by concentrating the heavy metal free solution in vacuo to dryness.

Alternatively, the 2-heterocyclic benzimidazole compounds may be synthesized by reacting an o-nitroaniline with a carboxylic acid, ester or acid halide derivative of the heterocycle in a suitable inert medium such as pyridine, benzene and the like. An intermediate nitroaniline is formed initially. The nitro group is then reduced and benzimidazole formation effected by the treatment of the intermediate anilide with a metal-acid reducing system such as iron-hydrochloric acid, zinc-acetic acid and the like or by catalytic reduction. As in the above-mentioned process, where a heavy metal reagent is employed to bring about benzimidazole formation, the free benzimidazole is recovered in a manner analogous to that described above.

The 1-substituted-2-heterocyclic benzimidazoles, where R is alkyl or alkenyl and X is oxygen or sulfur in Formulae I and II above, may be further synthesized by alkylation or alkenylation of the 2-heterocyclic benzimidazole itself. According to this method, an alkali metal salt of the benzimidazole is reacted with an ester of a strong acid and a lower alkanol or lower alkenol, such as methyl bromide, methyl iodide, allyl bromide or with an alkyl sulfate such as dimethyl sulfate.

The amount of 2-heterocyclic benzimidazole required for optimum control of helminthiasis will, of course, vary in accordance with such factors as the particular compound employed, the species of animal to be treated, the species of infecting parasites and the nature and length of treatment. In general, we have found that the compounds described herein when administered orally to domestic animals in daily doses of from about 0.1 mg. to about 400 mg. per kilogram of animal body weight are highly effective in controlling helminthiasis without intolerable toxic effect. When the compounds are to be employed as therapeutic agents good results are obtained when the animals are fed a daily dose of from about 5 mg. to about 400 mg. and preferably 15 mg. to 250 mg. per kilogram body weight. This may be administered in a single dose or divided into a plurality of smaller doses and administered over a period of 24 hours. With the preferred compounds, i.e., the 2-(2'-thienyl) and 2-(3'-thienyl) benzimidazoles, the administration of from about 15 mg. to about 100 mg. per kilogram body weight for only a single day is generally sufficient to rid the animal of many species of infecting parasites. Where prophylactic treatment is desired and the compounds are fed continuously, satisfactory results are obtained when the animals are fed daily dosages of from 0.1 mg. to 50 mg. per kilogram body weight. Because the optimum amount of benzimidazole compound employed for prophylactic or therapeutic treatment varies depending on such factors as mentioned above, there is some overlapping between the prophylactic and therapeutic ranges set forth in the preceding general discussion.

For therapeutic application or use, the 2-heterocyclic benzimidazoles are conveniently administered orally in a unit dosage form such as in a capsule or in the form of a tablet, bolus, drench and the like. In such usage, the compounds may be blended with one or more innocuous orally ingestable excipients including diluents, fillers, binders, lubricants, disintegrating agents, suspending agents, wetting agents and the like. Such compositions may be readily prepared by conventional formulating techniques and are particularly useful when administration is to be made in a single dose or divided doses over a period of 24 hours. In addition to the above excipients, the solid compositions may also contain a material of enteric character, that is, one which when associated with the active ingredient maintains the active ingredient in inert or inoperative form so long as the composition remains in the acidic stomach, but which releases the active ingredient when the composition reaches the intestine. Such enteric compositions are particularly useful for the treatment of animals suffering from severe helminthic infection of the intestinal tract. The provision of such enteric property can, for example, be accomplished by coating tablets and boluses in conventional manner with one of the commonly employed enteric coatings such as those containing fatty acids, resins, waxes, synthetic polymers and the like.

The exact amount of 2-heterocyclic benzimidazole to be employed in the above compositions may vary provided that a sufficient amount of the composition is ingested to provide the required dosage of active ingredient. In general, tablets, boluses and drenches containing from about 5% to about 70% by weight of active ingredient may be satisfactorily employed to supply the desired dosage.

Alternatively, the 2-heterocyclic benzimidazole may be administered dispersed in or admixed with the normal elements of animal sustenance, i.e., the feed, drinking water and/or other liquids normally partaken by the animals. This method is preferred where it is desired to administer the 2-heterocyclic benzimidazoles continuously, either as a therapeutic or prophylactic agent, over a period of several days or more. However, in such a usage, it is to be understood that the present invention also contemplates the employment of compositions containing the benzimidazole compounds intimately dispersed in or admixed with any other carrier or diluent which is inert, i.e., substantially non-reactive with respect to the active ingredient, orally administrable and tolerated by the animals. Such compositions may be utilized in the form of powders, pellets, suspensions and the like and are adapted to be fed to animals to supply the desired dosage or to be employed as concentrates or supplements and subsequently diluted with additional carrier or feed to produce the ultimate composition. Examples of carriers or diluents suitable for such compositions are solid orally ingestable carriers such as distillers' dried grains, alfalfa, corn meal, citrus meal, fermentation residues, ground oyster shells, attapulgus clay, wheat shorts, molasses solubles, corn cob meal, edible vegetable substances, toasted dehulled soya flour, soybean mill feed, antibiotic mycelia, soya grits, crushed limestone and the like. In the preparation of solid compositions the active ingredient is intimately dispersed or admixed throughout the feed or other solid carrier by methods such as grinding, stirring, milling or tumbling. By selecting proper diluents and by altering the ratio of carrier to active ingredient, compositions of any desired concentration may be prepared. Where the compounds are provided as a constituent of the feed, the required dosage may be supplied with feed compositions containing from about 0.001%–3% by weight of the benzimidazole compound. Such medicated feed compositions can be prepared either for direct use by mixing the above amount of active ingredient directly with the feed or feed supplements containing higher concentrations of the active ingredient uniformly dispersed in a solid edible carrier such as mentioned above can be prepared and subsequently diluted with the feed to produce the desired concentration of active ingredient for feeding. Since it is convenient for the feed manufacturer to use about one pound of feed supplement for each ton of finished feed, the preferred concentration of active ingredient in the feed supplement is partly a function of the level of active ingredient desired in the finished feed. In general, feed supplements containing from about 5% to about 50% by weight of active ingredient may be satisfactorily employed to supply the desired dosage in the finished feed.

Examples of typical feed supplements containing the 2-heterocyclic benzimidazoles dispersed in a solid inert carrier are:

| | Lbs. |
|---|---|
| A. 2-(2'-thienyl) benzimidazole | 5.0 |
| Corn distillers' dried grains | 95.0 |
| B. 2-(3'-thienyl) benzimidazole | 10.0 |
| Wheat shorts | 90.0 |
| C. 2-(2'-furyl) benzimidazole | 12.5 |
| Molasses solubles | 87.5 |
| D. 2-(3'-furyl) benzimidazole | 15.0 |
| Soya grits | 40.0 |
| Wheat shorts | 45.0 |
| E. 2-(2'-pyrryl) benzimidazole | 20.0 |
| Ground oyster shells | 40.0 |
| Citrus meal | 40.0 |
| F. 2-(2'-thienyl)-5-methyl benzimidazole | 25.0 |
| Corn meal | 75.0 |
| G. 2-(2'-thienyl)5,6-dimethyl benzimidazole | 30.0 |
| Ground oyster shells | 55.0 |
| Antibiotic mycelia | 15.0 |
| H. 1-ethyl-2-(2'-thienyl) benzimidazole | 40.0 |
| Soybean mill feed | 60.0 |
| I. 1-allyl-2-(2'-furyl) benzimidazole | 50.0 |
| Corn meal | 50.0 |

In the preparation of these and other similar feed supplements, the active ingredient is added to the carrier and the whole mixed to give substantially uniform dispersion of the anthelmintic agent in the carrier.

For the prophylatic treatment of larger animals such as sheep and cattle, a further means of administration comprises admixing an amount of the active ingredient sufficient to provide each animal to be so treated with a prophylactic dose per day with salt. The resulting loose salt mixture can be used as such or if desired the mixture can be compressed into salt blocks.

The anthelmintic activity of certain 2-heterocyclic benzimidazoles in sheep was experimentally demonstrated according to the following tests:

Sheep naturally infected with gastro-intestinal nematodes were each fed a single oral dose in capsule form of from 50 to 250 mg./kg. of animal body weight of the 2-heterocyclic benzimidazole. The effect of the compounds on the gastro-intestinal worms was determined by counting the number of worm eggs present in the feces before and 3 weeks after treatment. The number of worm eggs per gram of feces was determined by the Stoll method which is known in the art. The anthelmintic efficacy was also determined by recovering the worms expelled in the feces for 72 hours following treatment. All feces passed for 72 hours after treatment were collected in sacks fitted over the hindquarters of the animals at the time of dosing. The fecal material was diluted with water to a volume of 4–8 liters and stirred to a uniform suspension. An aliquot one-tenth the volume of the suspension was removed, and the worms collected on a 40 mesh screen. The worms, preserved in 2% formalin, were counted and identified microscopically. The following table summarizes the tests and results obtained.

TABLE I

| Test Compound | Dose, mg./kg. | No. of Sheep Treated | Mean No. of Adult Worms Recovered After Treatment [1] | Mean No. of Worm Eggs/Gm. of feces | |
|---|---|---|---|---|---|
| | | | | Pre-Treatment | Post-Treatment |
| 2-(2'-thienyl)benzimidazole | 200 | 2 | 1,770 | 3,590 | <1 |
| Do | 100 | 4 | 2,040 | 290 | 12 |
| Do | 50 | 2 | 4,910 | 260 | 45 |
| 2-(2'-furyl)benzimidazole | 250 | 2 | 5,925 | 1,500 | <4 |
| Do | 100 | 2 | 3,295 | 1,275 | 73 |
| 2-(3'-thienyl)benzimidazole | 100 | 2 | 5,075 | 2,040 | 10 |
| Do | 50 | 2 | 1,460 | 1,326 | 133 |

[1] The species of worms recovered include *Haemonchus contortus, Trichostrongylus axei, Ostertagia circumcincta, Trichostrongylus colubriformis, Trichostrongylus vitrinus, Cooperia curticei, Nematodirus spathiger, Bunostomum trigonocephalum, Oesophogostomum columbianum, Chabertia ovina* and *Trichuris ovis*.

The 2-heterocyclic benzimidazoles described herein are also effective in preventing the development of infective eggs and/or larvae of worms thereby minimizing the possibility of contamination and subsequent reinfestation.

The preparation of representative compounds and compositions containing such compounds is more fully described in the following examples. However, these examples are illustrative and are not to be considered as limiting the invention.

EXAMPLE 1

*2-(3'-Thienyl) Benzimidazole*

37.4 g. of o-phenylenediamine is dissolved in 570 ml. of methanol. To this solution is added, with stirring, 136 g. of cupric acetate in 1,700 ml. of hot water and 41.2 g. of 3-thienyl aldehyde in 273 ml. of methanol. The mixture is stirred for one hour and the precipitate which forms is filtered off and washed with water and then with ethanol. The solid material is suspended in about 2 liters of ethanol and the mixture saturated with hydrogen sulfide gas. The precipitated copper sulfide is removed by filtration and the filtrate treated with activated charcoal. The charcoal is removed by filtration and the filtrate concentrated in vacuo to dryness. The residue is washed with ether, recrystallized twice from boiling methanol, washed with ether and dried in vacuo at 100° C. Crystalline 2-(3'-thienyl) benzimidazole is obtained, M.P. 336–338° C.

When the above process is carried out employing 2-thienyl aldehyde in place of 3-thienyl aldehyde there is obtained 2-(2'-thienyl) benzimidazole.

Ten pounds of 2-(3'-thienyl) benzimidazole is uniformly mixed with 90 pounds of wheat shorts. The resulting feed supplement contains 10% active ingredient. One pound of this supplement uniformly mixed with 100 pounds of an animal feed produces a feed composition containing 0.1% active ingredient.

EXAMPLE 2

2-(3'-Furyl) Benzimidazole 6 g. of o-nitroaniline is added to 100 ml. of benzene containing 6 g. of 3-furoyl chloride. The reaction takes place immediately. The mixture is extracted with water, dilute hydrochloric acid, water, dried over sodium sulfate and concentrated to a residue. The solid nitro-aniline thus obtained is recrystallized from ether. This material is dissolved in 50 ml. of acetic acid and 25 ml. of concentrated hydrochloric acid is added to the solution. While heating the solution on a steam bath, zinc dust is added cautiously until a colorless solution is obtained. The mixture is then refluxed for 3 hours. Upon cooling, a crystalline zinc salt forms which is recovered by filtration and extracted three times with 100 ml. portions of a 1:1 mixture of 6 N. ammonium hydroxide and ethyl acetate. The ethyl acetate layers are combined and treated with decolorizing charcoal and the filtrate obtained after removal of the charcoal is concentrated in vacuo to dryness. The solid thus obtained is recrystallized from ethyl acetate yielding 2-(3'-furyl) benzimidazole, M.P. 305–307° C.

When 2-furoyl chloride is employed in the above process in place of 3-furoyl chloride there is obtained 2-(2'-furyl) benzimidazole.

EXAMPLE 3

2-(2'-Pyrryl) Benzimidazole 20 g. of 2-pyrryl aldehyde in 125 ml. of methanol is added dropwise with stirring to 22 g. of o-phenylenediamine in 125 ml. of methanol. After a short period of stirring, 40 g. of cupric acetate monohydrate in 500 ml. of water is added in portions with stirring. After stirring for one hour the suspension is refluxed gently for one hour, then cooled and the precipitate which forms filtered off and washed with a small amount of cold water. The solid material is suspended in 500 ml. of ethanol and the mixture saturated with hydrogen sulfide gas. The precipitated copper sulfide is removed by filtration and the filtrate treated with activated charcoal. The charcoal is removed by filtration and the filtrate concentrated in vacuo to a gummy residue. The residue is dissolved in 200 ml. of ether and passed through a column containing 500 g. of acid washed alumina. The column is eluted first with a 1:1 ether-ethyl acetate mixture and then with ethyl acetate. To the combined eluates is added 150 ml. of warm 1.5 N. aqueous potassium hydroxide. The mixture is filtered and the filtrate acidified with hydrochloric acid to a pH of about 6 to precipitate the 2-(2'-pyrryl) benzimidazole. Recrystallization from ethyl acetate yields 2-(2'-pyrryl) benzimidazole, M.P. 273–275° C.

When 3-pyrryl aldehyde is employed in place of 2-pyrryl aldehyde in the above process, 2-(3'-pyrryl) benzimidazole is obtained.

EXAMPLE 4

2-(2'-Thienyl)-5,6-Dimethyl Benzimidazole 8.4 g. of 2-thienyl aldehyde is added dropwise to a suspension of 10 g. of 4,5-dimethyl-o-phenylenediamine in 400 ml. of ethanol. After stirring for 30 minutes at room temperature, 16 g. of cupric acetate in 400 ml. of water is added. After stirring for about one hour at room temperature, the suspension is refluxed gently for about one hour. After cooling, the copper salt of the benzimidazole is filtered off and washed with water. The solid salt is suspended in 700 ml. of a 9:1 mixture of ethanol and water and the mixture saturated with hydrogen sulfide gas. The precipitated copper sulfide is removed by filtration and the filtrate concentrated in vacuo to obtain crystalline 2-(2'-thienyl)-5,6-dimethyl benzimidazole. This product is dissolved in 350 ml. of ethanol and the solution filtered and diluted with 50 ml. of water. On cooling, the 2-(2'-thinyl)-5,6-dimethyl benzimidazole crystallizes and is recovered by filtration. The product is recrystallized from ethanol and then from ethyl acetate yielding 2-(2'-thienyl)-5,6-dimethyl benzimidazole, M.P. 239–242° C.

When 3-thienyl aldehyde, 2-furyl aldehyde, 3-furyl aldehyde, 2-pyrryl aldehyde and 3-pyrryl aldehyde are employed in the above process in place of 2-thienyl aldehyde there is obtained, respectively, 2-(3'-thienyl)-5,6-dimethyl benzimidazole, 2-(2'-furyl)-5,6-dimethyl benzimidazole, 2-(2'-pyrryl)-5,6-dimethyl benzimidazole and 2-(3'-pyrryl)-5,6-dimethyl benzimidazole.

In a similar fashion, when 4,5-diethyl-o-phenylenediamine and 4,5-dimethoxy-o-phenylenediamine are employed in the above process in place of 4,5-dimethyl-o-phenylenediamine there is obtained, respectively, 2-(2'-thienyl)-5,6-diethyl benzimidazole and 2-(2'-thienyl)-5,6-dimethoxy benzimidazole.

EXAMPLE 5

2-(2'-Thienyl)-5-Methyl Benzimidazole 30.4 g. of 5-methyl-2-nitroaniline in 400 ml. of ethanol is treated with hydrogen at a pressure of about 40 lbs. per square inch in the presence of 4 g. of 5% palladium on charcoal catalyst. A pressure drop of 23 lbs. per square inch takes place. The solution is filtered and 25 g. of 2-thienyl aldehyde is added dropwise to the filtrate containing the methylated o-phenylenediamine. The reaction mixture is stirred at room temperature for about 30 minutes. 40 g. of cupric acetate in 400 ml. of water is added to the mixture to precipitate the copper salt of 2-(2'-thienyl)-5-methyl benzimidazole which is then recovered by filtration. The solid salt is then suspended in 500 ml. of ethanol and the mixture saturated with hydrogen sulfide gas. The precipitated copper sulfide is removed by filtration and the filtrate concentrated in vacuo to dryness. The residue is recrystallized twice from ethyl acetate yielding 2-(2'-thienyl)-5-methyl benzimidazole, M.P. 253–255° C.

When the above process is carried out employing 5-ethyl-2-nitroaniline and 5-methoxy-2-nitroaniline in place of 5-methyl-2-nitroaniline there is obtained 2-(2'-thienyl)-5-ethyl benzimidazole and 2-(2'-thienyl)-5-methoxy benzimidazole.

EXAMPLE 6

1-Methyl-2-(2'-Thienyl) Benzimidazole 3 g. of 2-(2'-thienyl) benzimidazole is dissolved in boiling methanol containing a few drops of phenolphthalein solution. To this solution is added 15 ml. of 1 N alcoholic sodium methoxide and 2 ml. of dimethyl sulfate. After a rapid reaction the solution is no longer alkaline. The same quantities of sodium methoxide and dimethyl sulfate are added again followed by an additional 25 ml. of sodium methoxide solution. The final solution is concentrated to dryness and the residue extracted with portions of benzene. To the combined benzene extracts is added activated charcoal. After filtering off the charcoal the benzene solution is concentrated to a residue of 1-methyl-2-(2'-thienyl) benzimidazole. The product is crystallized in petroleum ether and then dissolved in Skellysolve B leaving a small residue which is filtered off. The resulting solution is treated with activated charcoal. After filtering off the charcoal, the solution is cooled yielding 1-methyl-2-(2'-thienyl) benzimidazole, M.P. 85–87° C.

EXAMPLE 7

1-Allyl-2-(2'-Furyl) Benzimidazole

To 3 g. of 2-(2'-furyl) benzimidazole in 40 ml. of dimethylformanide is added 720 ml. of a 54.5% sodium hydride emulsion in mineral oil. The mixture is extracted with petroleum ether to remove the mineral oil and then 2 ml. of allyl bromide is added. The mixture becomes warm and after 15 minutes it is heated on a steam cone for 15 minutes, cooled, diluted with water, dried over magnesium sulfate and concentrated in vacuo to a residue. The residue is dissolved in ether and passed through a column to remove colored material. The eluate is then concenrtated in vacuo at 80° C. to a residue. The residue is dissolved in ether and the solution passed through a column containing a layer of charcoal and Supercel on top of a layer of alumina. The eluate is evaporated to dryness and the residue remaining extracted with petroleum ether. The ether extract is then evaporated to dryness yielding 1-allyl-2-(2'-furyl) benzimidazole, M.P. 41–45° C. A careful fractional crystallization of this material from Skellysolve B yields 1-allyl-2-(2'-furyl) benzimidazole, M.P. 51–52° C.

EXAMPLE 8

1-Methyl-2-(2'-Pyrryl) Benzimidazole

To 12.2 g. of N-methyl-o-phenylenediamine in 100 ml. of methanol is added with a stirring 10 g. of 2-pyrryl aldehyde in 50 ml. of methanol and 20 g. of cupric acetate in 400 ml. of hot water. The mixture is stirred for one hour and the precipitate which forms is filtered off and washed with water and then with ethanol. The solid material is suspended in about 2 liters of ethanol and the mixture saturated with hydrogen sulfide gas. The precipitated copper sulfide is removed by filtration and the filtrate treated with activated charcoal. The charcoal is removed by filtration. On concentration of the filtrate to dryness, solid 1-methyl-2-(2'-pyrryl) benzimidazole is obtained.

EXAMPLE 9

A. 5 g. of 2-(2'-thienyl) benzimidazole is added with stirring to 100 ml. of ethanol saturated with dry hydrogen chloride. An additional 125 ml. of ethanol is added and the resulting solution is treated with 5 g. of activated charcoal. The charcoal is removed by filtration and the filtrate diluted with 3 times its volume of ethyl ether. The resulting mixture is chilled and after a short time crystals of 2-(2'-thienyl) benzimidazole monohydrochloride appear.

B. 5 g. of 2-(3'-pyrryl) benzimidazole is added at room temperature to 100 ml. of absolute ethanol saturated with dry hydrogen bromide. An additional 150 ml. of ethanol is added and the mixture warmed. This warm solution is treated with 3 g. of activated charcoal and the charcoal removed by filtration. The resulting solution is diluted with dry ethyl ether to a volume of 1 liter. On cooling and chilling in an ice bath, 2-(3'-pyrryl) benzimidazole dihydrobromide crystallizes.

C. 50 mg. of 2-(2'-furyl) benzimidazole in 5 ml. of ethanol is treated with 3 drops of 50% sulfuric acid. Dilution of the mixture with ether and cooling yields the sulfate salt of 2-(2'-furyl) benzimidazole.

EXAMPLE 10

A bolus having the following composition

|  | Gm. |
|---|---|
| 2-(2'-thienyl) benzimidazole | 2.0 |
| Dicalcium phosphate | 3.0 |
| Starch | 0.535 |
| Guar gum (through 60 mesh screen) | 0.15 |
| Talc (through 60 mesh screen) | 0.14 |
| Mg stearate (through 60 mesh screen) | 0.04 | is prepared in the following manner:

The dicalcium phosphate is thoroughly mixed with the 2-(2'-thienyl) benzimidazole and the mixture reduced to a particle size finer than 60 mesh. To the mixture is added 0.330 gm. of starch in the form of an aqueous starch paste and the resulting mixture is granulated in the usual manner. The granules are then passed through a #10 mesh screen and dried at 110°–130° F. for about 8 hours. The dried material is then passed through a #16 mesh screen. The guar gum and the balance of the starch are added and the mixture thoroughly blended. The remainder of the ingredients are then added and the whole thoroughly mixed and compressed.

Boluses containing 2 g. of 2-(2'-furyl) benzimidazole, 2-(3'-furyl) benzimidazole or 2-(3'-pyrryl) benzimidazole are prepared in similar manner.

EXAMPLE 11

A bolus having the following composition

|  | Gm. |
|---|---|
| 2-(3'-thienyl) benzimidazole | 4.0 |
| Dicalcium phosphate | 1.0 |
| Starch | 0.702 |
| Guar gum (through 60 mesh screen) | 0.16 |
| Talc (through 60 mesh screen) | 0.11 |
| Mg stearate (through 60 mesh screen) | 0.028 | is prepared in the following manner:

The dicalcium phosphate is thoroughly mixed with the 2-(3'-thienyl) benzimidazole and the mixture reduced to a particle size finer than 60 mesh. To the mixture is added 0.430 gm. of starch in the form of an aqueous starch paste and the resulting mixture is granulated in the usual manner. The granules are then passed through a #10 mesh screen and dried at 110°–130° F. for about 8 hours. The dried material is then passed through a #16 mesh screen. The guar gum and the balance of the starch are added and the mixture thoroughly blended. The remainder of the ingredients are then added and the whole thoroughly mixed and compressed.

EXAMPLE 12

A tablet having the following composition

|  | Mg. |
|---|---|
| 2-(2'-pyrryl) benzimidazole | 250 |
| Dicalcium phosphate | 250 |
| Starch | 125 |
| Guar gum (through 60 mesh screen) | 17 |
| Talc (through 60 mesh screen) | 14 |
| Mg stearate (through 60 mesh screen) | 5 | is prepared in the following manner:

The dicalcium phosphate, 2-(2'-pyrryl) benzimidazole and 50 mg. of starch are thoroughly mixed and the mixture reduced to a particle size finer than 60 mesh. To the mixture is added 45 mg. of starch in the form of an aqueous starch paste and the resulting mixture is granulated in the usual manner. The granules are then passed through a #10 mesh screen and dried at 110°–130° F. for about 8 hours. The dried material is then passed through a #16 mesh screen. The guar gum and the balance of the starch are added and the mixture thoroughly blended. The remainder of the ingredients are then added and the whole thoroughly mixed and compressed.

Any departure from the above description which con-

What is claimed is:

1. A supplement composition for incorporation in animal feeds which comprises a grain carrier having dispersed therein from about 5% to about 50% by weight of a compound selected from the class consisting of compounds having the formula

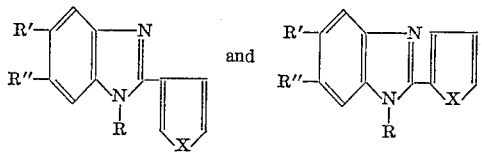

wherein R is selected from the group consisting of hydrogen, lower alkyl and lower alkenyl, R' and R'' are selected from the group consisting of hydrogen, lower alkyl and lower alkoxy and X is selected from the group consisting of O, S, and NH, and the non-toxic acid addition salts thereof.

2. A composition comprising an animal feed having dispersed therein from about 0.001% to about 3% by weight of a compound selected from the class consisting of compounds having the formula

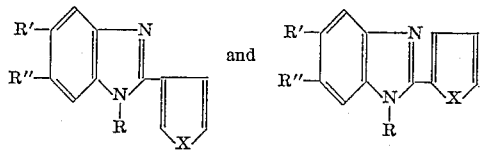

wherein R is selected from the group consisting of hydrogen, lower alkyl and lower alkenyl, R' and R'' are selected from the group consisting of hydrogen, lower alkyl and lower alkoxy and X is selected from the group consisting of O, S and NH, and the non-toxic acid addition salts thereof.

3. A composition useful against helminthiasis in domestic animals that comprises a veterinary drench composition containing a suspending agent and having dispersed therein from about 5–70% by weight of an anthelmintic agent selected from the class consisting of compounds having the formula

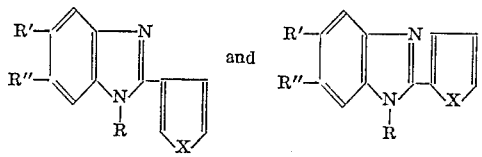

wherein R is selected from the group consisting of hydrogen, lower alkyl and lower alkenyl, R' and R'' are selected from the group consisting of hydrogen, lower alkyl and lower alkoxy and X is selected from the group consisting of O, S and NH, and the non-toxic addition salts thereof.

4. The composition of claim 3 wherein the benzimidazole compound is 2-(2'-thienyl) benzimidazole.

5. The composition of claim 3 wherein the benzimidazole compound is 2-(3'-thienyl) benzimidazole.

6. The composition of claim 3 wherein the benzimidazole compound is 2-(2'-furyl) benzimidazole.

7. The composition of claim 3 wherein the benzimidazole compound is 2-(2'-pyrryl) benzimidazole.

8. A method for preventing and controlling helminthic infections of animals which comprises orally administering to a helminth infected animal an anthelmintically effective amount of a compound selected from the group consisting of 2-thienyl benzimidazoles, 2-furyl benzimidazoles and 2-pyrryl benzimidazoles, and the non-toxic acid addition salts thereof.

References Cited in the file of this patent

UNITED STATES PATENTS 2,335,271    Graenacher et al. _____ Nov. 30, 1943
2,829,084    O'Neill et al. _____ Apr. 1, 1958

FOREIGN PATENTS 713,133    Great Britain _____ Aug. 4, 1954

OTHER REFERENCES

Weidenhagen et al.: Chem. Abstracts, vol. 38, col. 1235 (1944).
Jerchel: Chem. Abstracts, vol. 49, col. 10271–2 (1955).
Hein et al.: Chem. Abstracts, vol. 51, col. 6610 (1957).
Elderfield: "Heterocyclic Compounds," vol. 5, pp. 274–278 (1957).
Charlton: Chem. Abst., vol. 46, 1952, page 2005d.
Chem. Abst. (Jerchel), vol. 47, 1953, pp. 2752 and 2753.

UNITED STATES PATENT OFFICE
CERTIFICATE OF CORRECTION

Patent No. 3,155,571                                   November 3, 1964

Lewis H. Sarett et al.

It is hereby certified that error appears in the above numbered patent requiring correction and that the said Letters Patent should read as corrected below.

Column 12, line 12, after "non-toxic" insert -- acid --.

Signed and sealed this 6th day of April 1965.

(SEAL)
Attest:

ERNEST W. SWIDER                                EDWARD J. BRENNER
Attesting Officer                                    Commissioner of Patents